United States Patent
Rezaiifar et al.

(10) Patent No.: US 9,268,871 B2
(45) Date of Patent: Feb. 23, 2016

(54) METHODS AND APPARATUS FOR OBTAINING CONTENT WITH REDUCED ACCESS TIMES

(75) Inventors: Ramin Rezaiifar, San Diego, CA (US); Rohit Kapoor, San Diego, CA (US); Bibhu P. Mohanty, San Diego, CA (US); Michael Mitrani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 12/580,033

(22) Filed: Oct. 15, 2009

(65) Prior Publication Data

US 2011/0093610 A1    Apr. 21, 2011

Related U.S. Application Data

(60) Provisional application No. 61/106,111, filed on Oct. 16, 2008.

(51) Int. Cl.
| | |
|---|---|
| *G06F 15/16* | (2006.01) |
| *H04L 29/06* | (2006.01) |
| *G06F 17/30* | (2006.01) |

(Continued)

(52) U.S. Cl.
CPC ............ *G06F 17/30899* (2013.01); *H04L 1/08* (2013.01); *H04L 1/1812* (2013.01); *H04L 67/02* (2013.01)

(58) Field of Classification Search
USPC .................................................. 709/228–232
See application file for complete search history.

(56) References Cited

U.S. PATENT DOCUMENTS

| | | | |
|---|---|---|---|
| 6,442,603 B1 * | 8/2002 | Borella | ......................... 709/218 |
| 7,062,570 B2 | 6/2006 | Hong et al. | |

(Continued)

FOREIGN PATENT DOCUMENTS

| | | |
|---|---|---|
| JP | 11015850 | 1/1999 |
| JP | 11066049 | 3/1999 |

(Continued)

OTHER PUBLICATIONS

Fielding UC Irvine J Gettys C0mpaq/W3C J Mogul Compaq H Frystyk W3C/MIT L Masinter Xerox P Leach Microsoft T Berners-Lee W3C/MIT R: "Hypertext Transfer Protocol—Http/1.1; rfc2616. txt" IETF Standard, Internet Engineering Task Force, IETF, CH, Jun. 1, 1999, XP015008399 ISSN: 0000-0003.

(Continued)

*Primary Examiner* — Ninos Donabed
(74) *Attorney, Agent, or Firm* — Darren Simon; Satheesh Karra

(57) ABSTRACT

A method and apparatus for obtaining content with reduces round trip times is provided. The method may comprise transmitting, from a device, a primary content item request to a proxy server to obtain a primary content item using a first protocol, receiving the primary content item from the remote proxy using the first protocol, generating one or more secondary content item requests for one or more secondary content items associated with the primary content item, transmitting the one or more secondary content item requests to the proxy server using a second protocol, wherein the second protocol decouples the one or more secondary content item requests from an acknowledgement of receipt of the one or more secondary content item requests, and receiving at least one of the one or more secondary content items from the proxy server using the second protocol.

32 Claims, 7 Drawing Sheets

(51) Int. Cl.
  *H04L 1/08* (2006.01)
  *H04L 1/18* (2006.01)
  *H04L 29/08* (2006.01)

(56) References Cited

U.S. PATENT DOCUMENTS

| | | | |
|---|---|---|---|
| 7,096,200 B2 | 8/2006 | Wang et al. | |
| 7,706,740 B2 * | 4/2010 | Collins et al. | 455/3.01 |
| 2001/0021189 A1 * | 9/2001 | Shiota | H04L 45/00 370/389 |
| 2002/0062372 A1 * | 5/2002 | Hong et al. | 709/225 |
| 2002/0067723 A1 * | 6/2002 | Falys et al. | 370/389 |
| 2002/0101848 A1 * | 8/2002 | Lee | H04L 29/06 370/349 |
| 2002/0107934 A1 * | 8/2002 | Lowery | G06F 17/3087 709/213 |
| 2002/0191549 A1 * | 12/2002 | McKinley | H04L 41/0213 370/254 |
| 2003/0200175 A1 * | 10/2003 | Wang et al. | 705/50 |
| 2004/0181666 A1 * | 9/2004 | Candelore | H04N 7/162 713/160 |
| 2005/0210122 A1 * | 9/2005 | Taylor et al. | 709/218 |
| 2006/0224750 A1 * | 10/2006 | Davies | H04L 12/587 709/229 |
| 2006/0271708 A1 * | 11/2006 | Bolles | G06F 21/552 709/246 |
| 2007/0240231 A1 * | 10/2007 | Haswarey et al. | 726/28 |
| 2008/0016151 A1 * | 1/2008 | Howard et al. | 709/203 |
| 2008/0133702 A1 * | 6/2008 | Sharma et al. | 709/217 |
| 2011/0119323 A1 | 5/2011 | Tani et al. | |

FOREIGN PATENT DOCUMENTS

| | | |
|---|---|---|
| JP | 2003162472 A | 6/2003 |
| JP | 2007531405 A | 11/2007 |
| JP | 2008152629 A | 7/2008 |
| WO | WO2005094041 | 10/2005 |

OTHER PUBLICATIONS

International Search Report and Written Opinion—PCT/US2009/061092, International Search Authority—European Patent Office—Apr. 21, 2010.

Yamasaki Y., "A Parallel File Transfer Program HFTP on SR2201," 55th (1997, latter term) Proceedings of National Conference (1). Architecture, Software Science and Engineering, the Information Processing Society of Japan, Sep. 24, 1997, pp. 1-206-1-207.

* cited by examiner

METHODS AND APPARATUS FOR OBTAINING CONTENT WITH REDUCED ACCESS TIMES

CLAIM OF PRIORITY UNDER 35 U.S.C. §119

The present application for patent claims priority to Provisional Application No. 60/106,111 entitled "One-Shot Browsing to Reduce HTTP Page Download Delay" filed Oct. 16, 2008, and assigned to the assignee hereof and hereby expressly incorporated by reference herein.

BACKGROUND

1. Field

The disclosed aspects relate to communications between a device and a network to obtained web content.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

Still further, users of such device are interested in using the devices to access more web based content. Currently, a device may obtain web content relying on sequential transmission and acknowledgement protocols. As applied to a wired communications network, such protocols have not been found to be overly limiting, as the round trip times have been found to be relatively small. However, unlike in wired communications network, communications through wireless network may be unfavorably delayed through sequential transmission and acknowledgement protocols thereby increasing the time it takes to access web content.

Thus, improved apparatus and methods for obtaining content with access times are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with obtaining content with reduced access times. According to one aspect, a method for obtaining content with reduced access times is provided. The method can comprise transmitting, from a device, a primary content item request to obtain a primary content item using a first protocol, wherein the first protocol couples the primary content item request with an acknowledgement of receipt of the primary content item request. Further, the method can comprise receiving the primary content item using the first protocol. Still further, the method can comprise generating one or more secondary content item requests for one or more secondary content items associated with the primary content item. Additionally, the method can comprise transmitting the one or more secondary content item requests using a second protocol, wherein the second protocol decouples the one or more secondary content item requests from an acknowledgement of receipt of the one or more secondary content item requests. Moreover, the method can comprise receiving at least one of the one or more secondary content items using the second protocol.

Still another aspect relates to a computer program product comprising a computer-readable medium. The computer-readable medium can include a first set of codes for causing a computer to transmit, from a device, a primary content item request to a proxy server to obtain a primary content item using a first protocol, wherein the first protocol couples the primary content item request with an acknowledgement of receipt of the primary content item request. Further, the computer-readable medium can include a second set of codes for causing the computer to generate one or more secondary content item requests for one or more secondary content items associated with the primary content item. Still further, the computer-readable medium can include a third set of codes for causing the computer to transmit the one or more secondary content item requests using a second protocol, wherein the second protocol decouples the one or more secondary content item requests from an acknowledgement of receipt of the one or more secondary content item requests.

Yet another aspect relates to an apparatus. The apparatus can include means for transmitting, from a device, a primary content item request to obtain a primary content item using a first protocol, wherein the first protocol couples the primary content item request with an acknowledgement of receipt of the primary content item request. Further, the apparatus can comprise means for receiving the primary content item using the first protocol. Still further, the apparatus can comprise means for generating one or more secondary content item requests for one or more secondary content items associated with the primary content item. Additionally, the apparatus can comprise means for transmitting the one or more secondary content item requests using a second protocol, wherein the second protocol decouples the one or more secondary content item requests from an acknowledgement of receipt of the one or more secondary content item requests. Moreover, the apparatus can comprise means for receiving at least one of the one or more secondary content items using the second protocol.

Another aspect relates to an apparatus. The apparatus can include a communication module operable for: transmitting a primary content item request to obtain a primary content item using a first protocol, wherein the first protocol couples the primary content item request with an acknowledgement of receipt of the primary content item request, and receiving the primary content item using the first protocol. Further, the apparatus can include a content module operable for generating one or more secondary content item requests for one or more secondary content items associated with the primary content item. Still further, the apparatus communication module be operable for: transmitting the one or more secondary content item requests using a second protocol, wherein the second protocol decouples the one or more secondary content item requests from an acknowledgement of receipt of the one or more secondary content item requests, and receiving at least one of the one or more secondary content items using the second protocol.

Additionally, in accordance with one or more aspects and corresponding disclosure thereof, various aspects are described in connection with obtaining content for a device with reduced access times. According to one aspect, a method for obtaining content for a device with reduced access times is provided. The method can comprise receiving a primary content item request, from a device, for a web server, using a first protocol, wherein the first protocol couples the primary content item request with an acknowledgement of receipt of the primary content item request. Further, the method can comprise obtaining the requested primary content item from the web server using the first protocol. Still further, the method can comprise transmitting the obtained primary content item to the device using the first protocol. Additionally, the method can comprise receiving, from the device, one or more secondary content item requests using a second protocol, wherein the second protocol decouples the one or more secondary content item requests from an acknowledgement of receipt of the one or more secondary content item requests. Additionally, the method can comprise obtaining the one or more requested secondary content items corresponding to the one or more secondary content item requests, from the web server using the first protocol. Moreover, the method can comprise transmitting the obtained one or more secondary content items using the second protocol to the device.

Still another aspect relates to a computer program product comprising a computer-readable medium. The computer-readable medium can include a first set of codes for causing a computer to obtain, a requested primary content item from the web server using a first protocol, wherein the first protocol couples the primary content item request with an acknowledgement of receipt of the primary content item request. Further, the computer-readable medium can include a second set of codes for causing the computer to transmit the obtained primary content item to the device using the first protocol. Still further, the computer-readable medium can include a third set of codes for causing the computer to obtain one or more requested secondary content items corresponding to the one or more secondary content item requests from the web server using a second protocol, wherein the second protocol decouples the one or more secondary content item requests from an acknowledgement of receipt of the one or more secondary content item requests. Still further, the computer-readable medium can include a fourth set of codes for causing the computer to transmit the obtained one or more secondary content items using the second protocol to the device Yet another aspect relates to an apparatus. The apparatus can include means for receiving a primary content item request, from a device, for a web server, using a first protocol, wherein the first protocol couples the primary content item request with an acknowledgement of receipt of the primary content item request. Further, the apparatus can comprise means for obtaining the requested primary content item from the web server using the first protocol. Still further, the apparatus can comprise means for transmitting the obtained primary content item to the device using the first protocol. Yet further, the apparatus can comprise means for receiving, from the device, one or more secondary content item requests using a second protocol, wherein the second protocol decouples the one or more secondary content item requests from an acknowledgement of receipt of the one or more secondary content item requests. Additionally, the apparatus can comprise means for obtaining the one or more requested secondary content items corresponding to the one or more secondary content item requests, from the web server using the first protocol. Moreover, the apparatus can comprise means for transmitting the obtained one or more secondary content items using the second protocol to the device.

Another aspect relates to an apparatus. The apparatus can include a communication module operable for: receiving a primary content item request, from a device, for a web server, using a first protocol, wherein the first protocol couples the primary content item request with an acknowledgement of receipt of the primary content item request, obtaining the requested primary content item from the web server using the first protocol, transmitting the obtained primary content item to the device using the first protocol, receiving, from the device, one or more secondary content item requests using a second protocol, wherein the second protocol decouples the one or more secondary content item requests from an acknowledgement of receipt of the one or more secondary content item requests, obtaining the one or more requested secondary content items corresponding to the one or more secondary content item requests, from the web server using the first protocol, and transmitting the obtained one or more secondary content items using the second protocol to the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a user may attempt to retrieve content accessible from a web server 140 from a device 110. In one aspect, a device 110 may include: a wireless communications device (WCD), multiple devices, both wireline and wireless. For example, multiple devices may work in tandem, as a network, etc. In such an instance, the device 110 may obtain the requested primary content item, e.g. a main web page, for access by the user. Additionally, device 110 may communicate with a proxy server 130 to obtain secondary content items associated with the primary content item, e.g. a web page, object, etc, linked to the primary content item, prior to the user requesting such secondary content items. Retrieval of these secondary content items may be performed using a specific protocol. The specific protocol, hereinafter referred to as a second protocol, reduces the round trip time of a series of content item requests and corresponding acknowledgements by allowing the requests to be decoupled from any associated acknowledgement of a prior request. As such, using the second protocol, a plurality of requests may be sent over a single connection path unencumbered by any delays associated with waiting for an receipt acknowledgement response from a prior request.

Figure 1:
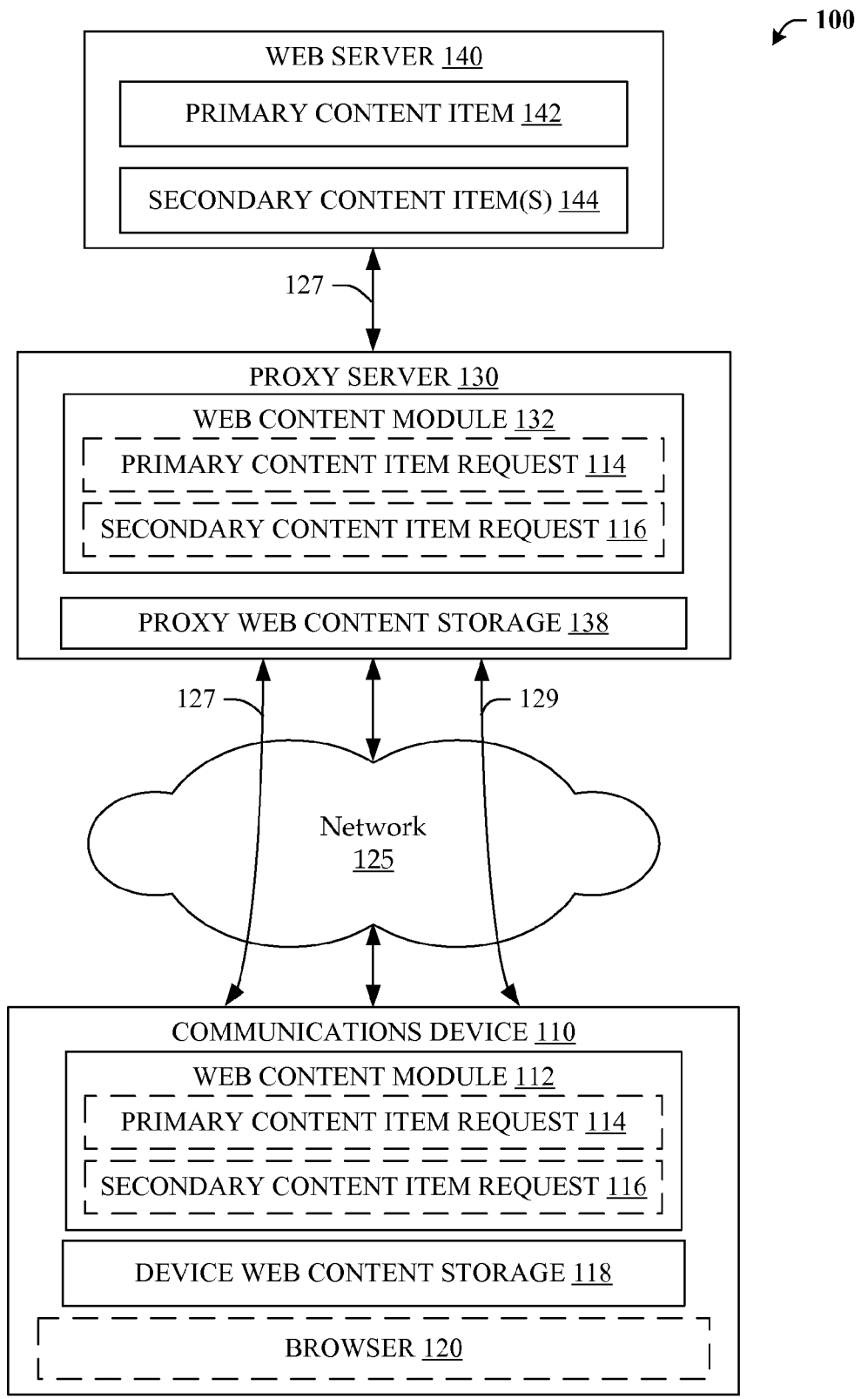
FIG. 1 illustrates a block diagram of a communication network according to an aspect.

With reference to FIG. 1, a block diagram of a communication network 100 according to an aspect is illustrated. Communication network 100 may include communications devices 110 connected to a communication network 125, e.g., a CDMA network, a GPRS network, a UMTS network, and other types of communication networks. Communication network 100 may further include a plurality of servers, such as proxy server 130, and web server 140, connected to communication network 125. In one aspect, the proxy server 130 facilitates communications between the communication device 110 and the web server 140, via network 125. Further, it should be noted that the functions performed by proxy server 130 may be performed internally by web server 140, by multiple remote servers, and/or by communications device 110.

In one aspect, communications device 110 may further include web content module 112 and device web content storage 118. In another aspect, communications device 110 may additionally include an application 120 for requesting web content, such as but not limited to a web browser. In one aspect, web content module 112 may include primary content items requests and secondary content items requests 116. For example, a primary content item request may be received from a user, through a web browser, requesting a main html web page, or the like. In another aspect, secondary content items may include any other items, accessible through the primary content item, such as, objects, content, etc., for which a client may use an HTTP GET to obtain. Continuing the example, such secondary content items may include additional web pages linked to the main web page, objects accessible for download or viewing from the main page, etc. Further, in one aspect, primary and/or secondary content items may be stored on the communications device 110 in device web content storage 118. Additionally, device web content storage 118 may be searched prior to requesting additional primary and/or secondary content items from a web server.

In one aspect, proxy server 130 may further include web content module 132 and proxy web content storage 138. In one aspect, web content module 132 may include primary content item requests 114 and secondary content item requests 116. Further, in one aspect, web server 140 may include one or more primary content items 142 and one or more secondary content items 144 stored in proxy web content storage 138.

In operation, communication device 110 may transmit a primary content item request 114 to a proxy server 130 via network 125. In one aspect, the transmission may be made using a first protocol 127. In such an aspect, the first protocol 127 may include Hyper Text Transfer Protocol (HTTP), etc., in which an acknowledgement of a GET message is required before a subsequent GET message can be transmitted. Further discussion of the first protocol 127 is provided with reference to FIG. 3A. Thereafter, proxy server 130 may receive the primary content item request (114). Proxy server 130 may transmit the primary content item request 114 (e.g. an HTTP GET) to a web server 140 to obtain the requested primary content item 142 using the first protocol 127. Upon receipt of the primary content item 142, the proxy server 130 may transmit the primary content item 142 to the requesting communications device 110 using the first protocol 127. Further, communications device 110 may process the received primary content item 142 to determine possible secondary content items 144 that may be requested by a user of the communications device 110. Such secondary content items may be requested using one or more secondary content items requests 116 and transmitted using a second protocol 129 to the proxy server 130. In such an aspect, the second protocol 129 may include a TCP connection and/or another like protocol in which subsequent GET messages are decoupled from receipt of an affirmative response (OK) to a prior GET message. In such an aspect, a transaction identifier may be added to the GET to distinguish which OK is associated with which GET. Further discussion of the second protocol 129 is provided with reference to FIG. 3B. Upon receipt of the one or more secondary content item requests 116 (e.g. HTTP GETs), proxy server 130 may retrieve one or more requested secondary content items 144 using the first protocol 127 from the web server 140 and may transmit such obtained secondary content items to communications device 110 using the second protocol 129. In one aspect, proxy server 130 may include a proxy web content storage 138 which may store previously requested primary and secondary content items (142, 144). In such an aspect, proxy server 130 may retrieve the requested primary and/or secondary content items from proxy web content storage 138 rather than requesting said content items from web server 140.

As such, a device may receive secondary content items through use of a second protocol to reduce round trip times and thereby allow quicker access to the secondary content items.

Figure 2:
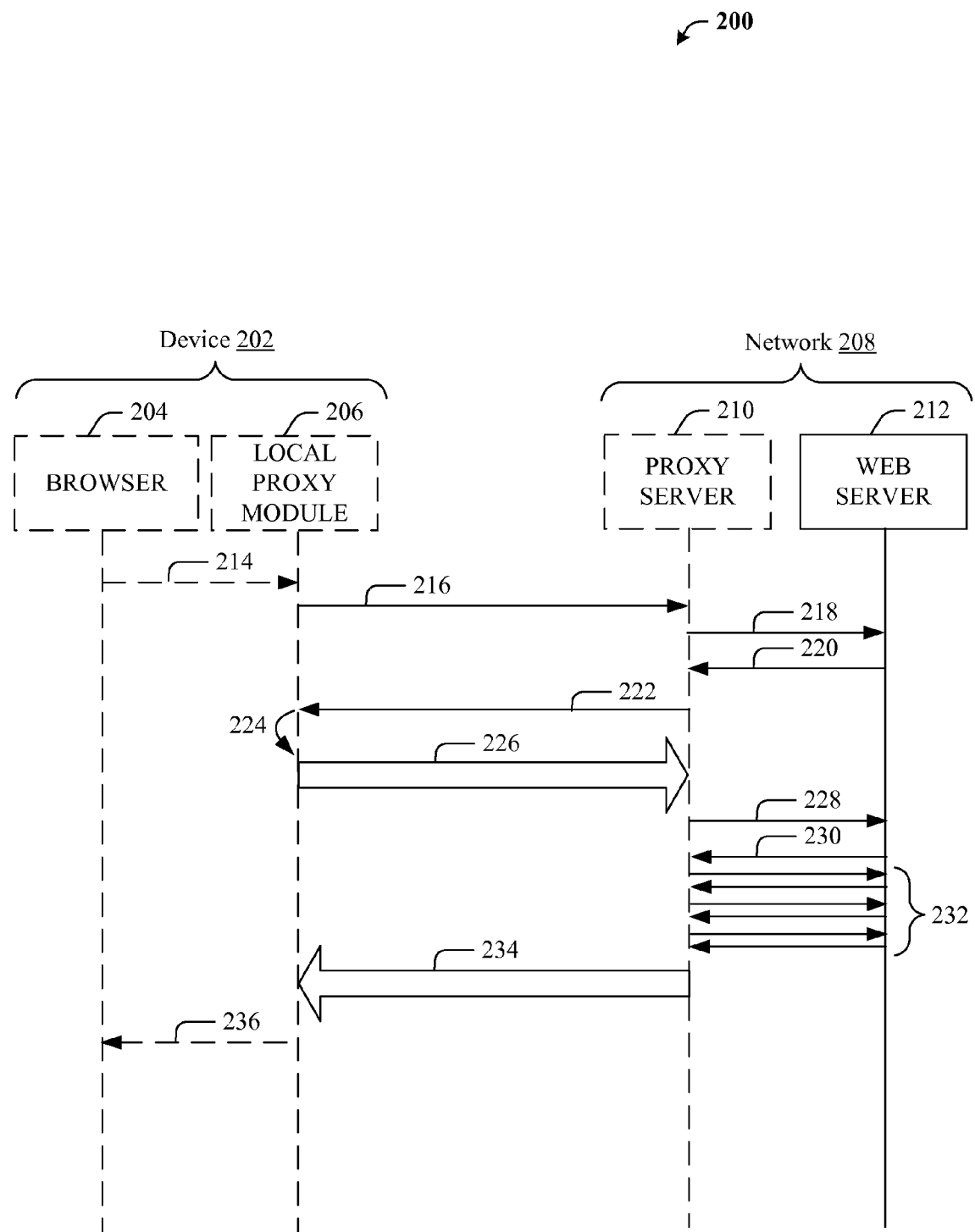
FIG. 2 illustrates a message sequence chart of operation of an aspect depicted in FIG. 1.

With reference to FIG. 2, operation of the subject matter depicted in FIG. 1 in the form of a message sequence diagram is illustrated. Generally, device 202 may request content from network 208. In one aspect, device 202 may include a web browser 204 to receive a web content request from a user and local proxy 206 to obtain the requested content. Further, network 208 may include a proxy server 210 to process content requests and one or more web servers 212 from which the requested content may be obtained.

In one aspect, web browser 204 may request a primary content item, at sequence step 214. For example, a primary content item may include a main web page, or the like. In one aspect, a primary content item request may include an additional header which includes an IP address for a specific web server 212 to which the request is to be transmitted. For example, when requesting content from an encrypted site, the IP address for the specified web server may be transmitted free of encryption. Further, in such an aspect, the additional header may include a transaction identifier that may define which connection path is used for communicating the request. At sequence step 216, local proxy module 206 transmits a primary content item request to proxy server 210. In one aspect, the transmission is communicated using a first protocol. In such an aspect, the first protocol may include Hyper Text Transfer Protocol (HTTP), etc., in which an acknowledgement of a GET message is required before a subsequent GET message can be transmitted. In another aspect, communications between the local proxy module 206 and proxy server 210 may be facilitated using a second protocol. In such an aspect, the second protocol may include a File Transfer Protocol (FTP) or another like protocol in which subsequent GET messages are decoupled from receipt of an affirmative response (OK) to a prior GET message.

At sequence stop 218, proxy server 210 transmits the primary content item request to a web server 212. In one aspect, proxy server 210 may be embodied as a physically separate server as web server 212. While in another aspect, web server 212 and/or related servers may perform functions associated with proxy server 210. In another aspect, the transmission is made using the first protocol. In yet another aspect, the primary content item request includes instructions selecting the web server 212. In one aspect, the request may be accompanied by an additional header which may include information specifying an IP address for a specified web server and may include a transaction identifier identifying the connection path on which the request was received. In another aspect, if the primary content item request was transmitted using the second protocol, the proxy server 210 may translate the primary content item request before transmitting the request using the first protocol. In such an aspect, translating may include receiving an HTTP GET using an HTTP protocol from device 202 on one or more TCP sockets and forwarding the HTTP GET using a HTTP protocol. In another aspect, the translating may include receiving an HTTP GET using a modified HTTP protocol, and forwarding the received GET using a standard HTTP protocol. In such an aspect, the modified HTTP protocol may include a transactional identifier associating each request (e.g. GET) with a subsequent corresponding response. Further, in such an aspect, use of a modified HTTP GET protocol may allow responses to be transmitted as they are obtained rather than waiting to respond in the same order as the GETs were received.

At sequence step 220, the requested primary content item may be transmitted to the proxy server 210. In one aspect, the transmission is made using the first protocol. At sequence step 222, the primary content item is transmitted to the device 202. In one aspect, the transmission is made using the first protocol. In another aspect, if the primary content item request was transmitted using the second protocol, the proxy server 210 may translate the primary content item received using the first protocol from the web server 212, to the second protocol before transmitting the requested item to the device 202. In another aspect, the content item may be transmitted over a connection path determined by a transaction identifier which accompanied the corresponding content item request.

At sequence step 224, device 202 may process the received primary content item to locate secondary content items accessible through the primary content item. In one aspect, local proxy module may further search the device 202 to determine if any of the located secondary content items are already stored on device 202. For example, device 202 may store web content items in a cache. At sequence step 226, the one or more located secondary content items, or in another aspect the non-cached located secondary content items, are requested through secondary content item requests transmitted to proxy server 210. In one aspect, each request may be associated with an additional header that may include a transaction identifier and an IP address for a specified web server. In such an aspect, requests for encrypted web content may be transmitted using non-encrypted (e.g. clean) IP addresses for the associated web server. In one aspect, the requests are transmitted without limitations associated with receiving an acknowledgement, using the second protocol. In such an aspect, the second protocol may decouple transmitting a request from a requirement of receiving an acknowledgement of a prior request. For example, a first request may be transmitted through a serial TCP connection using the second protocol, thereafter the second protocol allows a plurality of subsequent requests to be transmitted at the same time, or in a series, before an affirmative reception response for the first request is received.

At sequence step 228, proxy server 210 transmits the one or more received requests, using the first protocol, to web server 212 for the requested secondary content items. At sequence step 230 the requested secondary content items may be received from the web server 212 by the proxy server using the first protocol. In one aspect, as the first protocol may limit communications by requiring affirmative confirmation of the previous message receipt prior to transmitting a subsequent message, the proxy server 210 may transmit subsequent secondary content item requests in series after receiving an acknowledgement for a prior request. Such series transmissions are represented by the arrow set 232. At sequence step 234, the requested secondary content items are transmitted to device 202. In one aspect, the secondary content items are transmitted using the second protocol. In another aspect, the received secondary content items are stored on the device 202 for possible future access through a user selection. In another aspect, the secondary content items are transmitted over a connection path defined through an associated transaction identifier. In such an aspect, the remote proxy 210 may associate the transaction identifier from the additional header with a connection path (e.g. TCP socket) on which the request was received.

In one aspect, in a device which receives a request for one of the secondary content items from a web browser 204, at sequence step 236, the requested secondary content item may be provided to the web browser. In one aspect, the secondary content item may be retrieved from storage on the device 202. As such, a device may receive secondary content items through use of a second protocol to reduce web content accessing times.

Figure 3A:
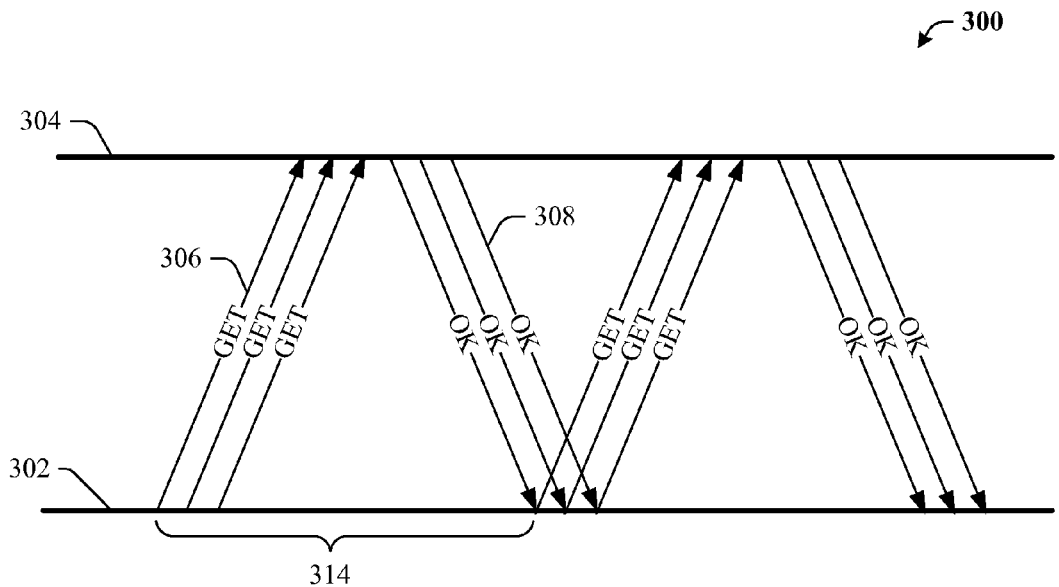
FIG. 3A illustrates a content request protocol used in an aspect message sequence chart depicted in FIG. 2.
Figure 3B:
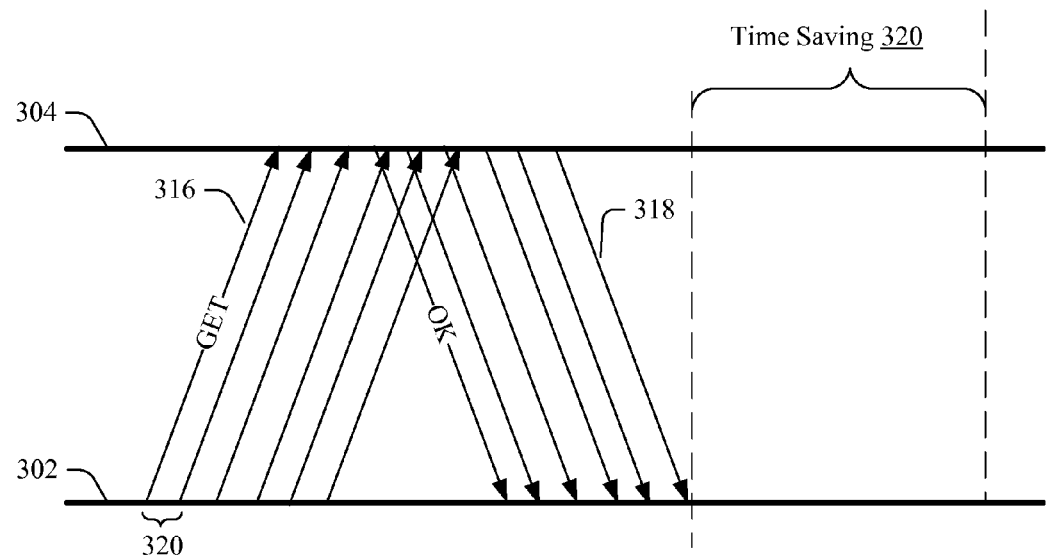
FIG. 3B illustrates another content request protocol used in an aspect message sequence chart depicted in FIG. 2.

Referring to FIGS. 3A and 3B, exemplary communication paths are depicted as parallel lines with a transmitting entity 302 and a receiving entity 304. Additionally, a communications from the transmitting entity 302 is depicted as a GET message (e.g. 306, 316), and a response from the receiving entity 304 is depicted as an OK message (e.g. 308, 318). The relationship between the GET messages and OK messages is described with reference to each of FIG. 3A and FIG. 3B.

With reference to FIG. 3A, exemplary communications using a first protocol are depicted, in which each GET message 306 is coupled to an acknowledgment of receipt (OK) message 308 such that a subsequent GET message may not be sent until the acknowledgement for the prior GET message is received. In one aspect, multiple sockets may be assigned for communications of GETs 306 and OKs 308. In such an aspect, the time between transmissions 314 over one or more sockets is limited by the round trip time of each coupled GET and OK message sequence. In one aspect, the first protocol may include a Hypertext Transfer Protocol (HTTP). For example, a primary content item request may be transmitted through a serial TCP connection using the HTTP, wherein the HTTP does not allow a subsequent content request to be transmitted through the serial TCP connection until an affirmative reception response for the transmitted primary content item request is received.

With reference to FIG. 3B, exemplary communications using a second protocol are depicted, in which each GET message 316 is not coupled to an acknowledgment of receipt (OK) message 318 such that any number of GET messages may be sent without being limited by the requirement of receiving the acknowledgement for prior associated GET messages. In one aspect, multiple GETs 316 may be transmitted over one or more sockets. In such aspects, the time between transmissions 320 using one or more sockets are not limited by the round trip time of the GET and OK message sequence. Therefore, a time saving 322 may be obtained through use of the second protocol. In one aspect, the second protocol may decouple requests from corresponding acknowledgements of receipt of the requests. For example, a first request may be transmitted through a serial TCP connection using the second protocol, thereafter the second protocol allows a second request to be transmitted before acknowledgement for the first request is received.

Figure 4:
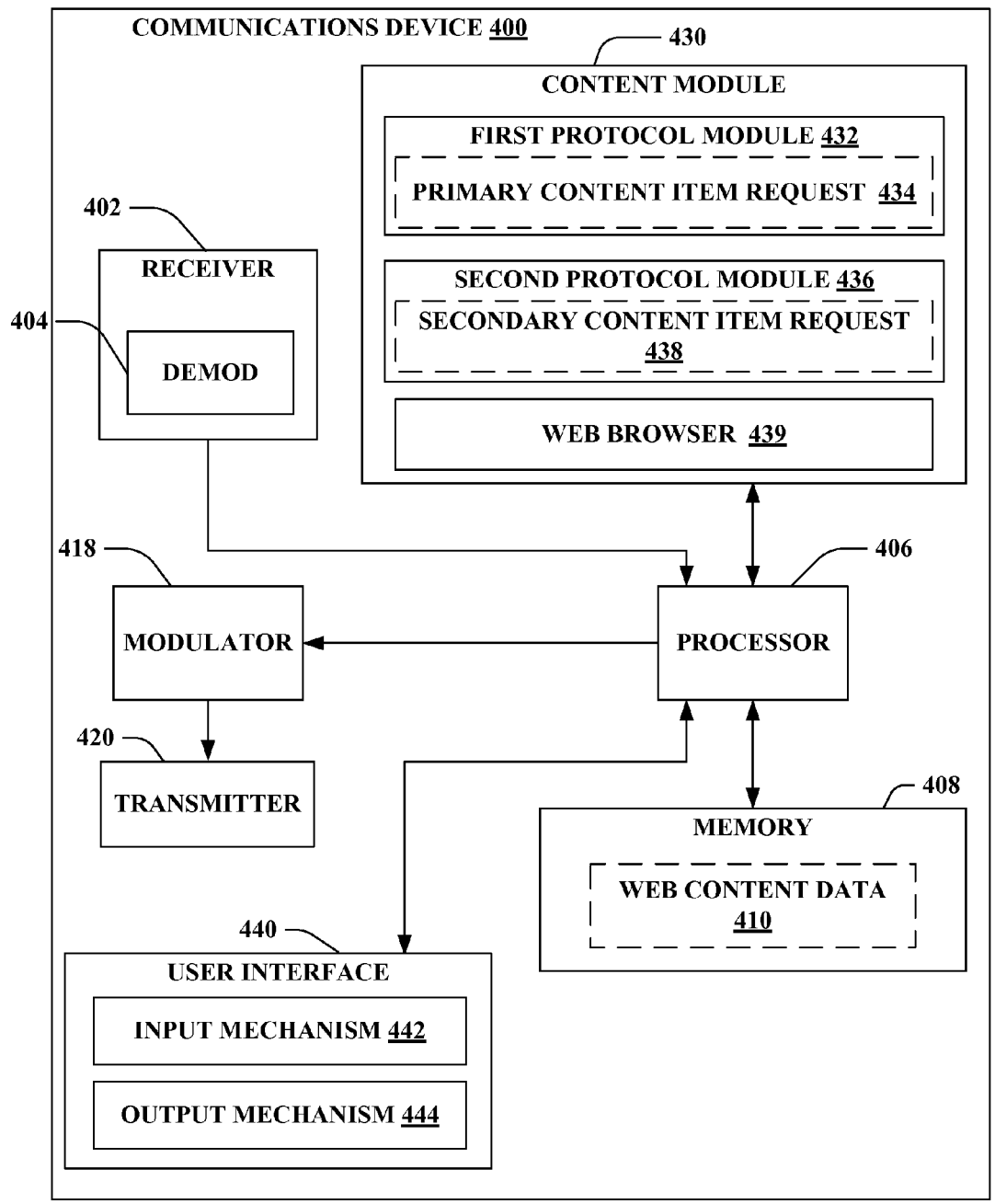
FIG. 4 illustrates a block diagram example architecture of a communications device.

While still referencing FIG. 1, but turning also now to FIG. 4, an example architecture of communications device 110 is illustrated. As depicted in FIG. 4, device 400 comprises receiver 402 that receives a signal from, for instance, a receive antenna (not shown), performs typical actions on (e.g., filters, amplifies, downconverts, etc.) the received signal, and digitizes the conditioned signal to obtain samples. Receiver 402 can comprise a demodulator 404 that can demodulate received symbols and provide them to processor 406 for channel estimation. Processor 406 can be a processor dedicated to analyzing information received by receiver 402 and/or generating information for transmission by transmitter 420, a processor that controls one or more components of mobile device 400, and/or a processor that both analyzes information received by receiver 402, generates information for transmission by transmitter 420, and controls one or more components of mobile device 400.

Mobile device 400 can additionally comprise memory 408 that is operatively coupled to processor 406 and that can store data to be transmitted, received data, information related to available channels, data associated with analyzed signal and/or interference strength, information related to an assigned channel, power, rate, or the like, and any other suitable information for estimating a channel and communicating via the channel. In one aspect, memory 408 can include web content data 410, such as but not limited to, at least a portion of objects, content, etc., obtained by device 400 during interaction with one or more web content providers. In one aspect, stored web content cached data 410 may be searched to determine if any currently requested secondary content items are already stored on the device 400. In another aspect, web content data 410 may include an indexing structure to further facilitate searching for currently requested secondary content. Memory 408 can additionally store protocols and/or algorithms associated with estimating and/or utilizing a channel (e.g., performance based, capacity based, etc.).

It will be appreciated that data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 408 of the subject systems and methods may comprise, without being limited to, these and any other suitable types of memory.

Mobile device 400 can further include content module 430 to facilitate and/or obtain web content for device 400. Content module 430 may further comprise first protocol module 432 to assist content module 430 in communicating a primary content item request 434 to a content provider, such as a web server, etc. In one aspect, a primary content item request 434 may include a request for content associated with a main web page. In another aspect, a primary content item request 434 may include instructions for a proxy server to obtain the primary content item from a web server. In one aspect, the first protocol may include a Hypertext Transfer Protocol (HTTP). For example, a primary content item request may be transmitted through a serial TCP connection using the HTTP and wherein the HTTP does not allow a subsequent content request to be transmitted through the serial TCP connection until an affirmative reception response for the transmitted primary content item request is received.

In one aspect, content module 430 may further process a received primary content item. In such an aspect, content module 430 may locate possible access points for secondary content item accessible through the primary content item. Further, in such an aspect, prior to generating secondary content item requests for the located secondary content items, content module 430 may search web content data 410 to determine if any located secondary content items may be stored in the device 400. Furthermore, such stored secondary content items may be made available to content module 430 and a request is not made for the stored secondary items.

Content module 430 may further comprise second protocol module 436 to assist content module 430 in communicating a one or more secondary content item request 438 to a proxy server, or the like. In one aspect, second protocol module 436 may process secondary content item requests 438 using a second protocol. In such an aspect, the second protocol may decouple any secondary content item requests from an acknowledgement of receipt of secondary content item requests from a proxy server. For example, a first of the one or more secondary content item requests may be transmitted through a serial TCP connection using the second protocol, thereafter the second protocol allows a second of the one or more secondary content item requests to be transmitted before an affirmative reception response for the first of the one or more secondary content item requests request is received.

In another aspect, content module 430 may further include web browser 439. In such an aspect, web browser 439 may receive user inputs through user interface 440 requesting certain web content. For example, a user may enable web browser 439 and provide input selecting a specific web page of interest. In such an example, web browser 439 may communicated the requested web page, as a primary content item request 434, to first protocol module 432 for processing.

Additionally, mobile device 400 may include user interface 440. User interface 440 may include input mechanisms 442 for generating inputs into communications device 400, and output mechanism 442 for generating information for consumption by the user of the communications device 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, the output mechanism 444 may include a display operable to present media content that is in image or video format or an audio speaker to present media content that is in an audio format.

In operation, a user may prompt the communications device 400 to initiate a first application through a second application. For example, first application may be an FM-RDS application; the second application may be a music download service application. Extension module 430 may facilitate communication of application data 410 and control information 412 between at least two applications through the use of application communication module 432 and application control module 434. For example, communicated application data 410 may include at least a portion of RDS data or digital music data, control information 412 may include control of a music download service application purchasing function, volume, display, etc. Furthermore, data and control module 436 may obtain and/or store at least a portion of application data 410 and control information 412 communicated between applications. For example, communications stored may include at least a portion of: the RDS data, or the digital music data, or a purchasing record, or any combination thereof.

Figure 5:
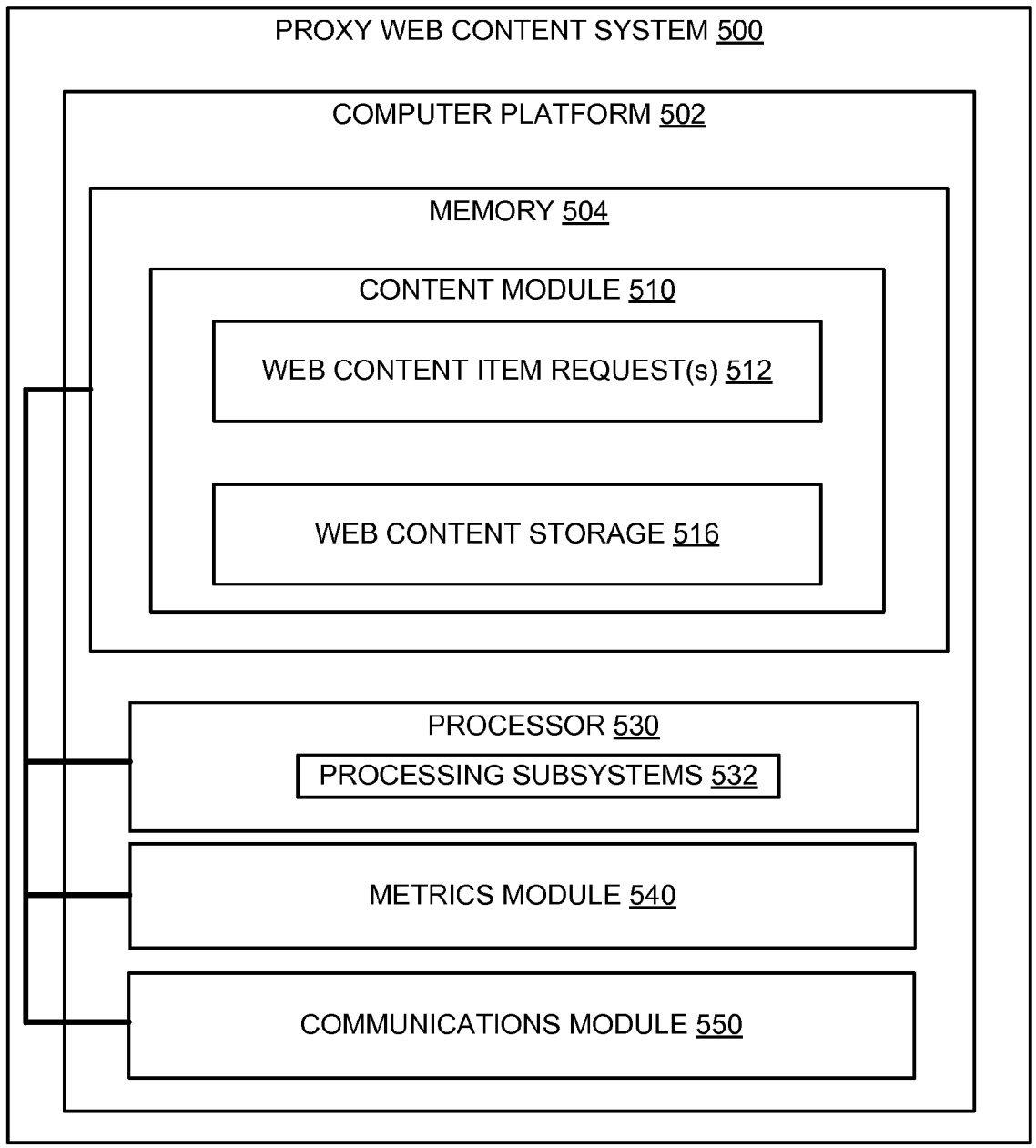
FIG. 5 illustrates exemplary block diagram of a proxy web content system according to an aspect.

With reference to FIG. 5, illustrated is a detailed block diagram of proxy web content system 500, such as proxy server 130 depicted in FIG. 1. Proxy web content system 500 may comprise at least one of any type of hardware, server, personal computer, mini computer, mainframe computer, or any computing device either special purpose or general computing device. Further, the modules and applications described herein as being operated on or executed by proxy web content system 500 may be executed entirely on a single network device, as shown in FIG. 5, or alternatively, in other aspects, separate servers, databases or computer devices may work in concert to provide data in usable formats to parties, and/or to provide a separate layer of control in the data flow between communications device 110, web server 140, etc., and the modules and applications executed by proxy web content system 500.

Proxy web content system 500 includes computer platform 502 that can transmit and receive data across wired and wireless networks, and that can execute routines and applications. Computer platform 502 includes memory 504, which may comprise volatile and nonvolatile memory such as read-only and/or random-access memory (ROM and RAM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Further, computer platform 502 also includes processor 530, which may be an application-specific integrated circuit ("ASIC"), or other chipset, logic circuit, or other data processing device. Processor 530 may include various processing subsystems 532 embodied in hardware, firmware, software, and combinations thereof, that enable the functionality of media content distribution system 14 and the operability of the network device on a wired or wireless network.

Computer platform 502 further includes communications module 550 embodied in hardware, firmware, software, and combinations thereof, that enables communications among the various components of extension system 500, as well as between extension system 500, devices 110, and servers 130, 140. Communication module 550 may include the requisite hardware, firmware, software and/or combinations thereof for establishing a wireless communication connection. According to described aspects, communication module 550 may include the necessary hardware, firmware and/or software to facilitate wireless communication between web server 140 and device 110.

Computer platform 502 further includes metrics module 540 embodied in hardware, firmware, software, and combinations thereof, that enables metrics received from device 110 corresponding to, among other things, data communicated between device 110 and web server 140. In one aspect, proxy web content system 500 may analyze data received through metrics module 540 to modify any web content 516 stored in memory 504. For example, if the metrics module 540 returns data indicating users select specific secondary content items more often than others, then such preferred secondary content may be stored in web content storage 516. As such, secondary content item requests may be reduced to a web server 140 and return time for content requested by a device 110 may be further reduced.

Memory 504 of proxy web content system 500 includes a content module 510 operable to facilitate obtaining primary and secondary content items from web servers, such as web server 140 depicted in FIG. 1, for wireless devices, such as device 110 depicted in FIG. 1. Content module 510 may include one or more web content item requests 512 and web content storage 516. In one aspect, the one or more web content item requests 512 (e.g. GETs) may include a primary content item request received from a wireless device, such as device 110, using a first protocol and relayed to a web server to retrieve the requested primary content item. In one aspect, the first protocol may include a Hypertext Transfer Protocol (HTTP). For example, the primary content item request may be transmitted through a serial TCP connection using the HTTP wherein the HTTP does not allow a subsequent content request to be transmitted through the serial TCP connection until an affirmative reception response for the transmitted primary content item request is received. In one aspect, secondary content item requests 514 may be generated by content module 510 for transmission to a web server associated with the primary content item using the first protocol. Further, in another aspect, the one or more web content item requests 512 (e.g. GETs) may include secondary content item requests received from a device 110 using a second protocol. In such an aspect, the secondary content items retrieved from the web server may be matched to the secondary content item requests received from the wireless device, and the matched secondary content items may be transmitted to the device using the second protocol. In one aspect, the second protocol may allow a second of the one or more secondary content item requests to be transmitted before an affirmative reception response for a first of the one or more secondary content item requests request is received.

Figure 6:
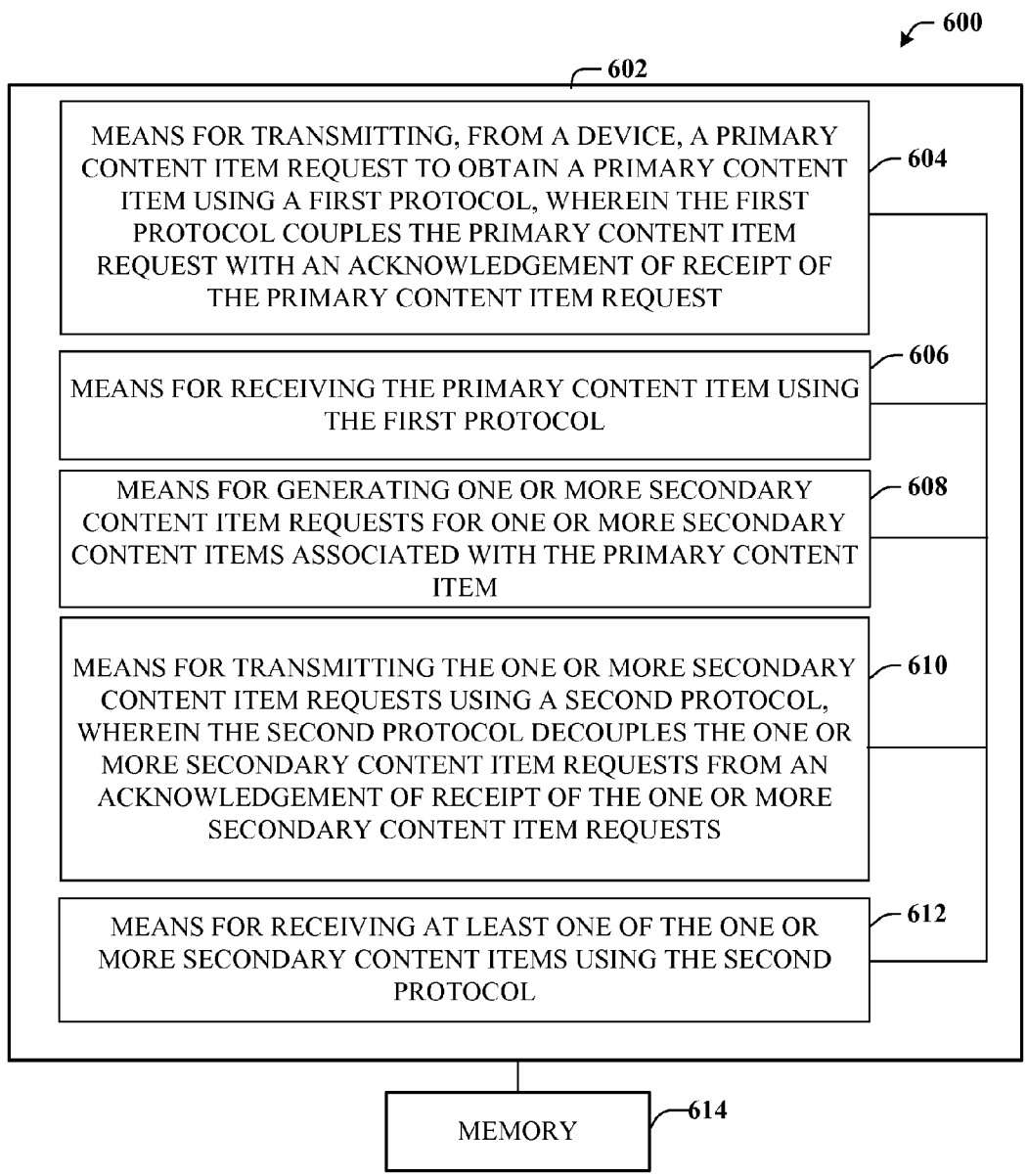
FIG. 6 illustrates a block diagram of an exemplary communications device that can obtain content with reduced access times.

With reference to FIG. 6, a block diagram of an exemplary system 600 that can obtain content with reduces round trip times is illustrated. For example, system 600 can reside at least partially within a wireless device. According to another example aspect, system 600 can reside at least partially within an access terminal. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include means for transmitting, from a device, a primary content item request to obtain a primary content item using a first protocol, wherein the first protocol couples the primary content item request with an acknowledgement of receipt of the primary content item request 604. In one aspect, the primary content item request may be received from a web browser, or the like, associated with the device. In another aspect, the primary content item may include a main web page, and wherein the one or more secondary content items include objects accessible through the main web page. In still another aspect, the primary content item request may include instructions for a proxy server to obtain the primary content item from a web server.

Further, logical grouping 602 can comprise means for means for receiving the primary content item using the first protocol 606. In one aspect, the first protocol may include a Hypertext Transfer Protocol (HTTP), wherein the primary content item request is transmitted through a TCP connection using the HTTP; and wherein the HTTP does not allow a subsequent content request to be transmitted through the TCP connection until the acknowledgement for the transmitted primary content item request is received. Further, logical grouping 602 can comprise means for generating one or more secondary content item requests for one or more secondary content items associated with the primary content item 608. In one aspect, the generating may include determining if any of the one or more secondary content items is stored on the device, and generating the secondary content item request for each of the secondary content items not stored on the device.

Further, logical grouping 602 can comprise transmitting the one or more secondary content item requests using a second protocol, wherein the second protocol decouples the one or more secondary content item requests from an acknowledgement of receipt of the one or more secondary content item requests 610. In one aspect, the transmitting the one or more secondary content item requests further may include transmitting through one or more connection paths, wherein the one or more connection paths allows the one or more secondary content item requests to be transmitted in series. In such an aspect, the connection path may be a TCP connection, and wherein the second protocol allows a plurality of the one or more secondary content item requests to be transmitted before the acknowledgement for any of the one or more secondary content item requests is received. Further, logical grouping 602 can comprise receiving at least one of the one or more secondary content items using the second protocol 612. In another aspect, the receiving the at least one of the one or more secondary content items may further include storing the received at least one of the one or more secondary content items in a cache associated with the device. Additionally, system 600 can include a memory 614 that retains instructions for executing functions associated with the means 604, 606, 608, 610 and 612. While shown as being external to memory 614, it is to be understood that one or more of the means 604, 606, 608, 610 and 612 can exist within memory 614.

Figure 7:
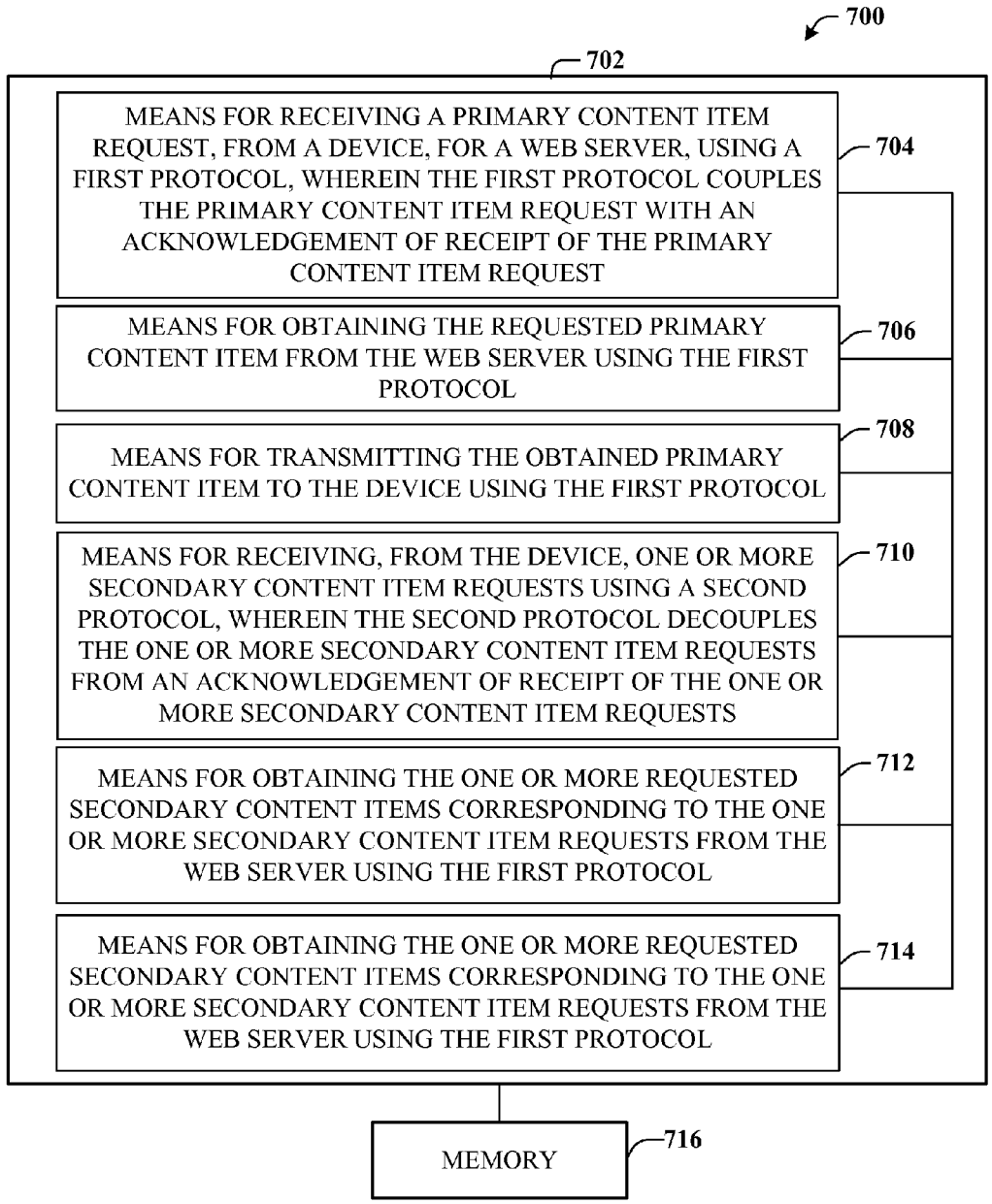
FIG. 7 illustrates a block diagram of an exemplary network device that can obtain content for a communications device with reduced access times.

With reference to FIG. 7, a block diagram of an exemplary system 700 that can obtain content for a wireless communications device with reduces round trip times is illustrated. For example, system 700 can reside at least partially within a wireless device. According to another example aspect, system 700 can reside at least partially within an access terminal. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include means for receiving a primary content item request, from a device, for a web server, using a first protocol, wherein the first protocol couples the primary content item request with an acknowledgement of receipt of the primary content item request 704. In one aspect, the first protocol may include a Hypertext Transfer Protocol (HTTP), the primary content item request may be transmitted through a TCP connection using the HTTP and the HTTP may not allow a subsequent content request to be transmitted through the TCP connection until the acknowledgement for the transmitted primary content item request is received. Further, logical grouping 702 can comprise means for obtaining the requested primary content item from the web server using the first protocol 706. In one aspect, the obtaining from the web server may further include storing the obtained one or more secondary content items in storage associated with the proxy server. Further, logical grouping 702 can comprise means for transmitting the obtained primary content item to the device using the first protocol 708. Further, logical grouping 702 can comprise receiving, from the device, one or more secondary content item requests using a second protocol, wherein the second protocol decouples the one or more secondary content item requests from an acknowledgement of receipt of the one or more secondary content item requests 710. Additionally, logical grouping 702 can comprise means for obtaining the one or more requested secondary content items corresponding to the one or more secondary content item requests from the web server using the first protocol 712.

Further, logical grouping 702 can comprise means for transmitting the obtained one or more secondary content items using the second protocol to the device 714. In one aspect, the second protocol may allow a secondary content item to be transmitted decoupled from acknowledging receipt of an associated secondary content item request. In another aspect, the transmitting the one or more secondary content items further may include transmitting through one or more connection paths, wherein the one or more connection paths may allow the one or more secondary content items to be transmitted in series. In such an aspect, the connection path may be a TCP connection and a first of the one or more secondary content items may be transmitted through the TCP connection using the second protocol, wherein the second protocol allows a plurality of the one or more secondary content items to be transmitted before the acknowledgement for the first of the one or more secondary content items is received. Additionally, system 700 can include a memory 716 that retains instructions for executing functions associated with the means 704, 706, 708, 710, 712 and 714. While shown as being external to memory 716, it is to be understood that one or more of the means 704, 706, 708, 710, 712 and 714 can exist within memory 716.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 602.11 (Wi-Fi), IEEE 602.16 (WiMAX), IEEE 602.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 602.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of obtaining content with reduced access times, the method comprising:

transmitting, from a device, a primary content item request to obtain a primary content item using a first protocol, wherein the first protocol couples the primary content item request with an acknowledgement of receipt of the primary content item request;

receiving the primary content item using the first protocol;

generating two or more secondary content item requests for two or more secondary content items associated with the primary content item;

transmitting the two or more secondary content item requests using a second protocol and through a connection path, wherein the second protocol decouples the two or more secondary content item requests from corresponding acknowledgements of receipt of the two or more secondary content item requests, and wherein the two or more secondary content item requests are transmitted in series through the connection path such that a second one of the two or more secondary content item requests is transmitted after a first one of the two or more secondary content item requests and before a second acknowledgement is received for the first one of the two or more secondary content item requests over the connection path;

receiving the second acknowledgement for at least the first one of the two or more secondary content item requests over the connection path after transmitting the second one of the two or more secondary content item requests; and receiving at least one of the two or more secondary content items using the second protocol, wherein the transmitting the primary content item request further comprises transmitting the primary content item request with a packet header, wherein the packet header includes an IP address for a specified web server and a transaction identifier identifying the primary content item request, and wherein the packet header defines which connection path is used for communicating the primary content item request, and wherein the transmitting the two or more secondary content item requests further comprises transmitting the two or more secondary content item requests with another packet header.

2. The method of claim 1, wherein the connection path is a TCP connection, and wherein the second protocol allows a plurality of the two or more secondary content item requests to be transmitted before one of the corresponding acknowledgements for any of the two or more secondary content item requests is received.

3. The method of claim 1, wherein the second protocol uses a transaction identifier to associate each secondary content item request with a corresponding acknowledgement of receipt of the secondary content item request.

4. The method of claim 1, further comprising:

receiving the primary content item request from a web browser associated with the device using the first protocol;

receiving a request for at least one secondary content items from the web browser;

obtaining the requested at least one secondary content item from the received at least one of the two or more secondary content items; and transmitting the obtained at least one secondary content item to the web browser using the first protocol.

5. The method of claim 1, wherein the generating further comprises:

determining if any of the two or more secondary content items is stored on the device; and wherein the generating of the one more secondary content item requests is for each of the two or more secondary content items determined to be not stored on the device.

6. The method of claim 1, wherein the first protocol includes a Hypertext Transfer Protocol (HTTP), wherein the primary content item request is transmitted through a TCP connection using the HTTP; and wherein the HTTP does not allow a subsequent content request to be transmitted through the TCP connection until the acknowledgement for the transmitted primary content item request is received.

7. The method of claim 1, wherein the primary content item includes a main web page, and wherein the two or more secondary content items include objects accessible through the main web page.

8. The method of claim 1, wherein the primary content item request further includes instructions for a proxy server to obtain the primary content item from a specified web server.

9. A non-transitory computer-readable medium comprising computer-executable code for obtaining content with reduced access times, the code comprising:

code for transmitting, from a device, a primary content item request to a proxy server to obtain a primary content item using a first protocol, wherein the first protocol couples the primary content item request with an acknowledgement of receipt of the primary content item request;

code for receiving the primary content item using the first protocol;

code for generating two or more secondary content item requests for two or more secondary content items associated with the primary content item; and code for transmitting the two or more secondary content item requests using a second protocol and through a connection path, wherein the second protocol decouples the two or more secondary content item requests from corresponding acknowledgements of receipt of the two or more secondary content item requests, and wherein the two or more secondary content item requests are transmitted in series through the connection path such that a second one of the two or more secondary content item requests is transmitted after a first one of the two or more secondary content item requests and before a second acknowledgement is received for the first one of the two or more secondary content item requests over the connection path;

code for receiving the second acknowledgement for at least the first one of the two or more secondary content item requests over the connection path after transmitting the second one of the two or more secondary content item requests; and code for receiving at least one of the two or more secondary content items using the second protocol, wherein the code for transmitting the primary content item request transmits the primary content item request with a packet header, wherein the packet header includes an IP address for a specified web server and a transaction identifier identifying the primary content item request, and wherein the packet header defines which connection path is used for communicating the primary content item request, and wherein the code for transmitting the two or more secondary content item requests transmits the two or more secondary content item requests with another packet header.

10. An apparatus, comprising:
  means for transmitting, from a device, a primary content item request to obtain a primary content item using a first protocol, wherein the first protocol couples the primary content item request with an acknowledgement of receipt of the primary content item request;
  means for receiving the primary content item using the first protocol;
  means for generating two or more secondary content item requests for two or more secondary content items associated with the primary content item;
  means for transmitting the two or more secondary content item requests using a second protocol and through a connection path, wherein the second protocol decouples the two or more secondary content item requests from corresponding acknowledgements of receipt of the two or more secondary content item requests, and wherein the two or more secondary content item requests are transmitted in series through the connection path such that a second one of the two or more secondary content item requests is transmitted after a first one of the two or more secondary content item requests and before a second acknowledgement is received for the first one of the two or more secondary content item requests over the connection path;
  means for receiving the second acknowledgement for at least the first one of the two or more secondary content item requests over the connection path after transmitting the second one of the two or more secondary content item requests; and
  means for receiving at least one of the two or more secondary content items using the second protocol,
  wherein the means for transmitting the primary content item request transmits the primary content item request with a packet header, wherein the packet header includes an IP address for a specified web server and a transaction identifier identifying the primary content item request, and wherein the packet header defines which connection path is used for communicating the primary content item request, and
  wherein the means for transmitting the two or more secondary content item requests transmits the two or more secondary content item requests with another packet header.

11. A device, comprising: a memory; at least one processor coupled to the memory, and a communication module, comprising a transmitter and a receiver, coupled to the at least one processor and/or the memory, wherein the communication module is operable for:
  transmitting a primary content item request to obtain a primary content item using a first protocol, wherein the first protocol couples the primary content item request with an acknowledgement of receipt of the primary content item request; and receiving the primary content item using the first protocol;
  wherein the at least one processor and the memory are operable to execute a content module operable for generating two or more secondary content item requests for two or more secondary content items associated with the primary content item; and wherein the communication module is further operable for:
  receiving the second acknowledgement for at least the first one of the two or more secondary content item requests over the connection path after transmitting the second one of the two or more secondary content item requests; and
  transmitting the two or more secondary content item requests using a second protocol and through a connection path, wherein the second protocol decouples the two or more secondary content item requests from corresponding acknowledgements of receipt of the two or more secondary content item requests and wherein the two or more secondary content item requests are transmitted in series through the connection path such that a second one of the two or more secondary content item requests is transmitted after a first one of the two or more secondary content item requests and before a second acknowledgement is received for the first one of the two or more secondary content item requests over the connection path;
  receiving at least one of the two or more secondary content items using the second protocol, wherein the communication module is operable for:
  transmitting the primary content item request, with a packet, header, wherein the packet header includes an IP address for a specified web server and a transaction identifier identifying the primary content, item request, and wherein the packet, header defines which connection path is used for communicating the primary' content item request; and transmitting the two or more secondary content item requests with another packet header.

12. The device of claim 11, wherein the connection path is a TCP connection, and wherein the second protocol allows a plurality of the two or more secondary content item requests to be transmitted before one of the corresponding acknowledgements for any of the two or more secondary content item requests is received.

13. The device of claim 11, wherein the second protocol uses a transaction identifier to associate each secondary content item request with a corresponding acknowledgement of receipt of the secondary content item request.

14. The device of claim 11, wherein the communication module is further operable for:
  receiving the primary content item request from a web browser associated with the device using the first protocol; and
  receiving a request for at least one of two or more secondary content items from the web browser;
  wherein the content module is further operable for obtaining the requested at least one of the two or more secondary content item content items from the received two or more secondary content items; and
  wherein the communication module is further operable for transmitting the obtained at least one of the two or more secondary content items to the web browser using the first protocol.

15. The device of claim 11, wherein the content module is further operable for:
  determining if any of the two or more secondary content items is stored on the device; and
  wherein the generating of the two or more secondary content item requests is for each of the two or more secondary content items determined to be not stored on the device.

16. The device of claim 11, wherein the first protocol includes a Hypertext Transfer Protocol (HTTP), wherein the primary content item request is transmitted through a TCP connection using the HTTP; and wherein the HTTP does not allow a subsequent content request to be transmitted through the TCP connection until the acknowledgement for the transmitted primary content item request is received.

17. The device of claim 11, wherein the primary content item includes a main web page, and wherein the two or more secondary content items include objects accessible through the main web page.

18. The device of claim 11, wherein the primary content item request further includes instructions for a proxy server to obtain the primary content item from a specified web server.

19. A method of obtaining content for a device with reduced access times, the method comprising:
    receiving a primary content item request, from the device, for a web server, using a first protocol, wherein the first protocol couples the primary content item request with an acknowledgement of receipt of the primary content item request;
    transmitting, to the device, the acknowledgement of receipt of the primary content item request;
    obtaining the requested primary content item from the web server using the first protocol;
    transmitting the obtained primary content item to the device using the first protocol;
    receiving, from the device, two or more secondary content item requests using a second protocol, wherein the second protocol decouples the two or more secondary content item requests from corresponding acknowledgements of receipt of the two or more secondary content item requests, and wherein the two or more secondary content item requests are received in series through a connection path such that a second one of the two or more secondary content item requests is received after a first one of the two or more secondary content item requests from the device and before transmitting a second acknowledgement of receiving the first one of the two or more secondary content item requests over the connection path;
    obtaining at least one of the two or more requested secondary content items corresponding to the two or more secondary content item requests, from the web server using the first protocol;
    transmitting the obtained at least one of the two or more secondary content items using the second protocol to the device through the connection path; and
    transmitting the second acknowledgement of receiving the first one of the two or more secondary content item requests over the connection path after transmitting the obtained at least one of the two or more secondary content items to the device,
    wherein the receiving the primary content item request further comprises receiving the primary content item request with a packet header, wherein the packet header includes an IP address for a specified web server and a transaction identifier identifying the primary content item request, and wherein the packet header defines which connection path is used for communicating the primary content item request, and
    wherein the receiving the two or more secondary content item requests comprises receiving the two or more secondary content item requests with another packet header.

20. The method of claim 19, wherein the connection path is a TCP connection, and wherein the second protocol allows a plurality of the two or more secondary content items to be transmitted before one of the corresponding acknowledgements for any of the two or more secondary content items is received.

21. The method of claim 19, wherein the second protocol uses a transaction identifier to associate each secondary content item request with a corresponding acknowledgement of receipt of the secondary content item request.

22. The method of claim 19, wherein the first protocol includes a Hypertext Transfer Protocol (HTTP), wherein the primary content item request is transmitted through a TCP connection using the HTTP, and wherein the HTTP does not allow a subsequent content request to be transmitted through the TCP connection until the acknowledgement for the transmitted primary content item request is received.

23. The method of claim 19, wherein the primary content item includes a main web page, and wherein the two or more secondary content items include objects accessible through the main web page.

24. The method of claim 19,
    wherein the transmitting the primary content item request or the two or more secondary content item requests further comprises transmitting the primary content item request or the two or more secondary content item requests to the IP address for the specified web server; and
    wherein transmitting the obtained content item further comprises using the transaction identifier to identify the connection path over which the primary content item request or the two or more secondary content item requests were received.

25. A non-transitory computer-readable medium comprising computer-executable code for obtaining content for a device with reduced access times, the code comprising:
    code for obtaining, a requested primary content item from a web server using a first protocol, wherein the first protocol couples the primary content item request with an acknowledgement of receipt of the primary content item request;
    code for transmitting the acknowledgement of receipt of the primary content item request;
    code for transmitting the obtained primary content item to the device using the first protocol;
    for obtaining at least one of two or more requested secondary content items corresponding to the two or more secondary content item requests from the web server using a second protocol, wherein the second protocol decouples the two or more secondary content item requests from corresponding acknowledgements of receipt of the two or more secondary content item requests, and wherein the two or more secondary content item requests are obtained in series through a connection path such that a second one of the two or more secondary content item requests is obtained after a first one of the two or more secondary content item requests from the device and before transmitting a second acknowledgement of receiving the first one of the two or more secondary content item requests over the connection path;
    code for obtaining at least one of the two or more requested secondary content items corresponding to the two or more secondary content item requests, from the web server using the first protocol;
    code for transmitting the obtained at least one of the two or more secondary content items using the second protocol to the device through the connection path; and
    code for transmitting an acknowledgement of receiving the first one of the two or more secondary content item requests over the connection path after transmitting the obtained at least one of the two or more secondary content items to the device, wherein the code for receiving the primary content item request receives the primary content item request with a packet header, wherein the packet header includes an IP address for a specified web server and a transaction identifier identifying the primary content item request, and wherein the packet header defines which connection path is used for communicating the primary content item request, and wherein the code for receiving the two or more secondary content item requests receives the two or more secondary content item requests with another packet header.

26. An apparatus, comprising:

means for receiving a primary content item request, from a device, for a web server, using a first protocol, wherein the first protocol couples the primary content item request with an acknowledgement of receipt of the primary content item request;

means for transmitting the acknowledgement of receipt of the primary content item request;

means for obtaining the requested primary content item from the web server using the first protocol;

means for transmitting the obtained primary content item to the device using the first protocol;

means for receiving, from the device, two or more secondary content item requests using a second protocol, wherein the second protocol decouples the two or more secondary content item requests from corresponding acknowledgements of receipt of the two or more secondary content item requests, wherein the two or more secondary content item requests are received in series through a connection path such that a second one of the two or more secondary content item requests is received after a first one of the two or more secondary content item requests from the device and before transmitting a second acknowledgement of receiving the first one of the two or more secondary content item requests over the connection path;

means for obtaining at least one of the two or more requested secondary content items corresponding to the two or more secondary content item requests, from the web server using the first protocol;

means for transmitting the obtained at least one of the two or more secondary content items using the second protocol to the device through connection path; and means for transmitting the second acknowledgement of receiving the first one of the two or more secondary content item requests over the connection path after transmitting the obtained at least one of the two or more secondary content items to the device, wherein the means for receiving the primary content item request receives the primary content item request with a packet header, wherein the packet header includes an IP address for a specified web server and a transaction identifier identifying the primary content item request, and wherein the packet header defines which connection path is used for communicating the primary content item request, and wherein the means for receiving the two or more secondary content item requests receives the two or more secondary content item requests with another packet header.

27. An apparatus, comprising:

a memory; at least one processor coupled to the memory, and a communication module, comprising a transmitter and a receiver, coupled to the at least one processor and/or the memory, wherein the communication module is operable for:

receiving a primary content item request, from a device, for a web server, using a first protocol, wherein the first protocol couples the primary content item request with an acknowledgement of receipt of the primary content item request;

transmitting the acknowledgement of receipt of the primary content item request;

obtaining the requested primary content item from the web server using the first protocol;

transmitting the obtained primary content item to the device using the first protocol;

receiving, from the device, two or more secondary content item requests using a second protocol, wherein the second protocol decouples the two or more secondary content item requests from corresponding acknowledgements of receipt of the two or more secondary content item requests, wherein the two or more secondary content item requests are received in series through a connection path such that a second one of the two or more secondary content item requests is received after a first one of the two or more secondary content item requests from the device and before transmitting a second acknowledgement of receiving the first one of the two or more secondary content item requests over the connection path;

obtaining at least one of the two or more requested secondary content items corresponding to the two or more secondary content item requests, from the web server using the first protocol;

transmitting the obtained at least one of the two or more secondary content items using the second protocol to the device through the connection path; and transmitting the second acknowledgement of receiving the first one of the two or more secondary content item requests over the connection path after transmitting the obtained at least one of the two or more secondary content items to the device, wherein the communication module is further operable for:

receiving the primary content item request with a packet header, wherein the packet header includes an IP address for a specified web server and a transaction identifier identifying the primary content item request, and wherein the packet header defines which connection path is used for communicating the primary content item request, and receiving the two or more secondary content item requests with another packet header.

28. The apparatus of claim 27, wherein the connection path is a TCP connection, and wherein the second protocol allows a plurality of the two or more secondary content items to be transmitted before one of the corresponding acknowledgements for any of the two or more secondary content items is received.

29. The apparatus of claim 27, wherein the second protocol uses a transaction identifier to associate each secondary content item request with a corresponding acknowledgement of receipt of the secondary content item request.

30. The apparatus of claim 27, wherein the first protocol includes a Hypertext Transfer Protocol (HTTP), wherein the primary content item request is transmitted through a TCP connection using the HTTP, and wherein the HTTP does not allow a subsequent content request to be transmitted through the TCP connection until the acknowledgement for the transmitted primary content item request is received.

31. The apparatus of claim 27, wherein the primary content item includes a main web page, and wherein the two or more secondary content items include objects accessible through the main web page.

32. The apparatus of claim 27, wherein the communication module is further operable for:
  transmitting the primary content item request or the two or more secondary content item requests to the IP address for the specified web server, and
  using the transaction identifier to identify the connection path over which the primary content item request or the two or more secondary content item requests were received.

* * * * *